(12) United States Patent
Tsai et al.

(10) Patent No.: US 11,291,211 B2
(45) Date of Patent: Apr. 5, 2022

(54) DOUGH KNEADING AND FEEDING SYSTEM OF DOUGH PROCESSING MACHINE

(71) Applicant: ANKO FOOD MACHINE CO., LTD., New Taipei (TW)

(72) Inventors: You-Chen Tsai, New Taipei (TW); Chien Yuan, New Taipei (TW)

(73) Assignee: ANKO FOOD MACHINE CO., LTD., New Taipei (TW)

( * ) Notice: Subject to any disclaimer, the term of this patent is extended or adjusted under 35 U.S.C. 154(b) by 361 days.

(21) Appl. No.: 16/421,482

(22) Filed: May 24, 2019

(65) Prior Publication Data

US 2020/0367509 A1 Nov. 26, 2020

(51) Int. Cl.
| | |
|---|---|
| A21C 1/06 | (2006.01) |
| A21C 1/14 | (2006.01) |
| B01F 35/75 | (2022.01) |
| B01F 27/721 | (2022.01) |

(52) U.S. Cl.
CPC ............. *A21C 1/065* (2013.01); *A21C 1/142* (2013.01); *A21C 1/144* (2013.01); *A21C 1/1415* (2013.01); *B01F 27/721* (2022.01); *B01F 35/754551* (2022.01)

(58) Field of Classification Search
CPC ......... A21C 1/065; A21C 1/142; A21C 1/144; A21C 1/1415; A21C 1/06; B01F 7/081; B01F 15/0289; B01F 7/00975; B01F 7/088; B01F 7/082; B01F 7/087; B01F 27/72; B01F 35/754551
See application file for complete search history.

(56) References Cited

U.S. PATENT DOCUMENTS

| | | | | |
|---|---|---|---|---|
| 3,090,605 | A * | 5/1963 | Copeland | B01F 7/081 366/298 |
| 3,332,369 | A * | 7/1967 | Freed | A21C 1/065 425/208 |
| 3,638,920 | A * | 2/1972 | Davis | B01F 7/081 366/298 |
| 4,480,927 | A * | 11/1984 | Peat | A01K 5/002 366/299 |
| 4,987,850 | A * | 1/1991 | McCracken | B02B 1/06 118/303 |

(Continued)

FOREIGN PATENT DOCUMENTS

EP 3581551 A1 * 12/2019 ............... B01F 7/04

*Primary Examiner* — Charles Cooley
(74) *Attorney, Agent, or Firm* — Cheng-Ju Chiang (57) ABSTRACT

A dough kneading and feeding system includes a dough barrel that defines a dough handling space in which a screw shaft is provided to extend through a shaft hole and a discharge opening of the dough barrel. An ejection nozzle is coupled with the discharge opening. The screw shaft includes a blade for driving a dough material toward the discharge opening located at the front side to be discharged through the ejection nozzle. At least one assisting screw is arranged, in combination with a bearing, to be parallel with the screw shaft in the dough handling space. The assisting screw includes at least one helical blade, which is rotatable to drive the dough material in a direction opposite to the direction of the dough material driven by the screw shaft and also to drive the dough material toward the screw shaft in a radial direction of the screw shaft.

1 Claim, 8 Drawing Sheets

(56) References Cited

U.S. PATENT DOCUMENTS

| | | | | |
|---|---|---|---|---|
| 5,538,747 | A * | 7/1996 | Mueller | B02B 1/06 |
| | | | | 426/507 |
| 5,630,944 | A * | 5/1997 | Terblanche | C05F 7/00 |
| | | | | 210/768 |
| 6,923,393 | B1 * | 8/2005 | Neier | A01K 5/002 |
| | | | | 241/260.1 |
| 2017/0030754 | A1 * | 2/2017 | Marchesini | B01F 15/0289 |
| 2019/0142018 | A1 * | 5/2019 | Wang | B01F 7/0005 |
| | | | | 366/100 |
| 2020/0367509 | A1 * | 11/2020 | Tsai | A21C 1/144 |

* cited by examiner

DOUGH KNEADING AND FEEDING SYSTEM OF DOUGH PROCESSING MACHINE

TECHNICAL FIELD OF THE INVENTION

The present invention relates generally to a dough kneading and feeding system of a dough processing machine, and more particularly to a dough kneading and feeding system that includes a unique assisting screw mechanism that helps prevent jamming of dough in an exit opening of a dough barrel during a continuous stirring operation carried out in a dough handling machine and also to make the dough effectively driven forward by a main shaft to ensure smooth feeding of the dough.

DESCRIPTION OF THE PRIOR ART

Figure 6:
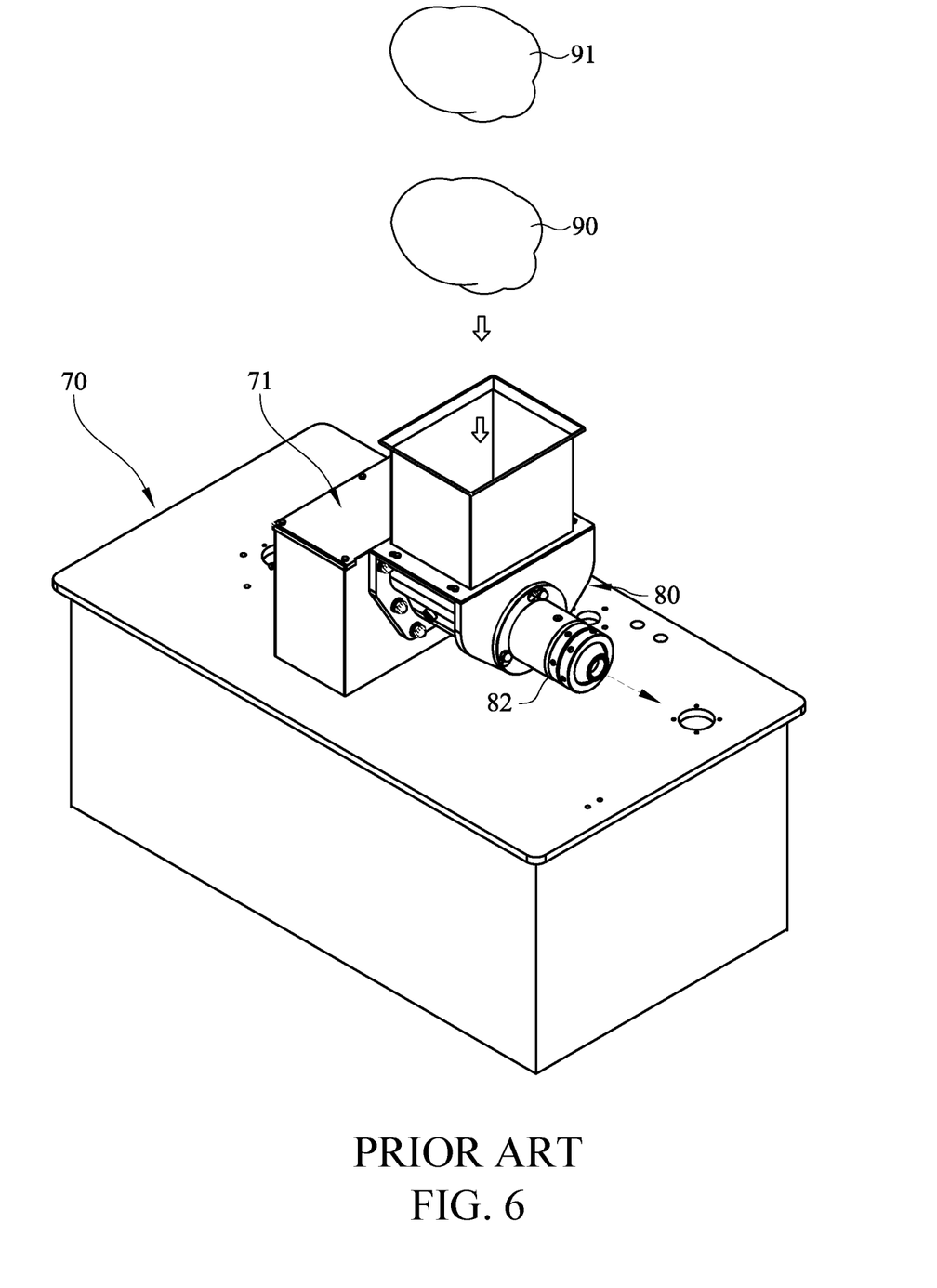
FIG. 6 is a schematic view illustrating a known kneading and feeding system of a dough processing machine.

A dough kneading and feeding system is an essential mechanism that is commonly used in food processing machines, and can be arranged as a standalone dough handling machine for the purpose of repeatedly kneading dough for multiple times so as to provide the dough so processed with certain elasticity that helps improve mouth feeling, before subsequent processing, such as a stuffing operation or a noodle making operation, is applied to the dough so processed to make a desired dough product. This is an essential or most important link of a chain of food processing carried out in the food processing machines. For a known dough kneading and feeding system used in a dough handling machine, reference is made to FIGS. 6, 7, and 8, generally, a power unit 70 and a rotation mechanism 71 (details of which are not illustrated) are provided to drive a screw shaft 83 that extends into a dough handling space 81 defined in a dough barrel 80. The screw shaft 83 has an end coupled to an ejection nozzle 82 of the dough barrel 80 and a blade 84 provided on the screw shaft 83 kneads dough 90 that is then ejected through the ejection nozzle 82 of the dough barrel 80 so as to shape the dough into a pre-prepared raw material for stuffing or noodle making.

Figure 7:
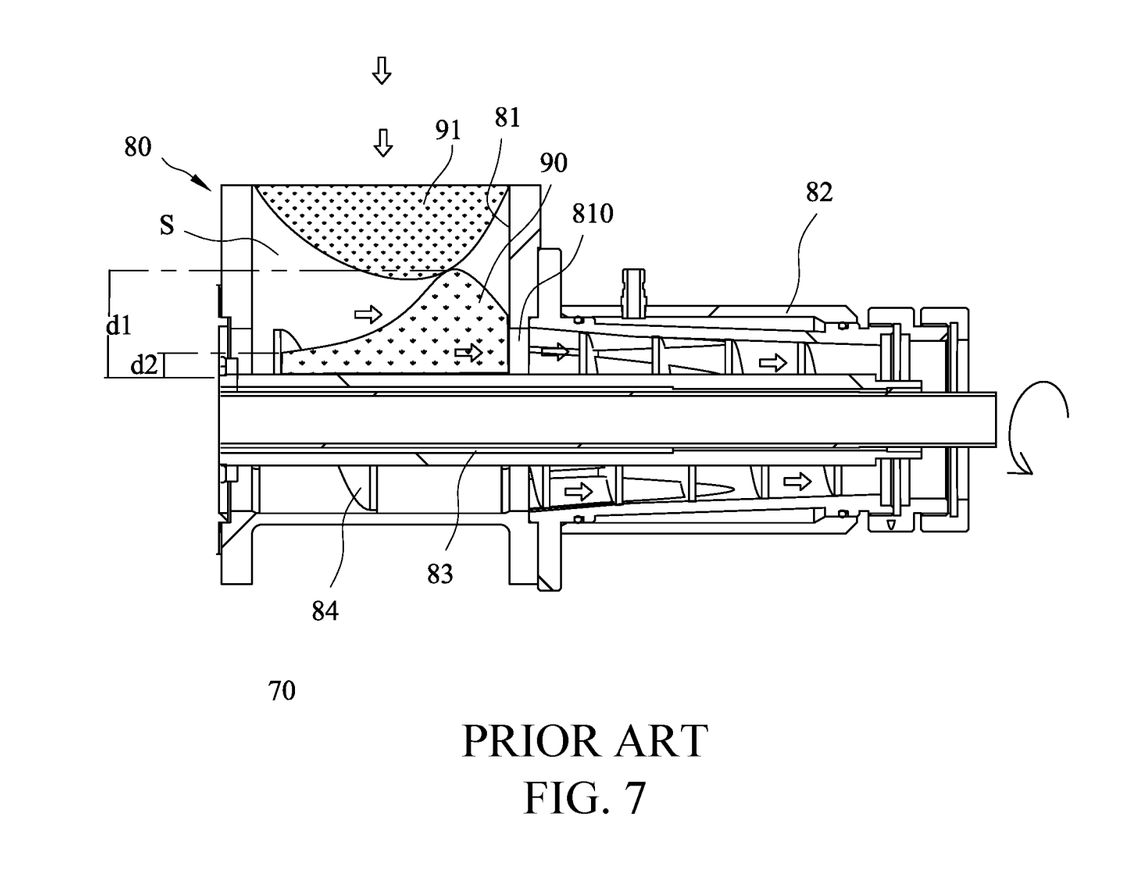
FIG. 7 is a schematic view demonstrating a drawback caused by the known kneading and feeding system during the operation thereof.
Figure 8:
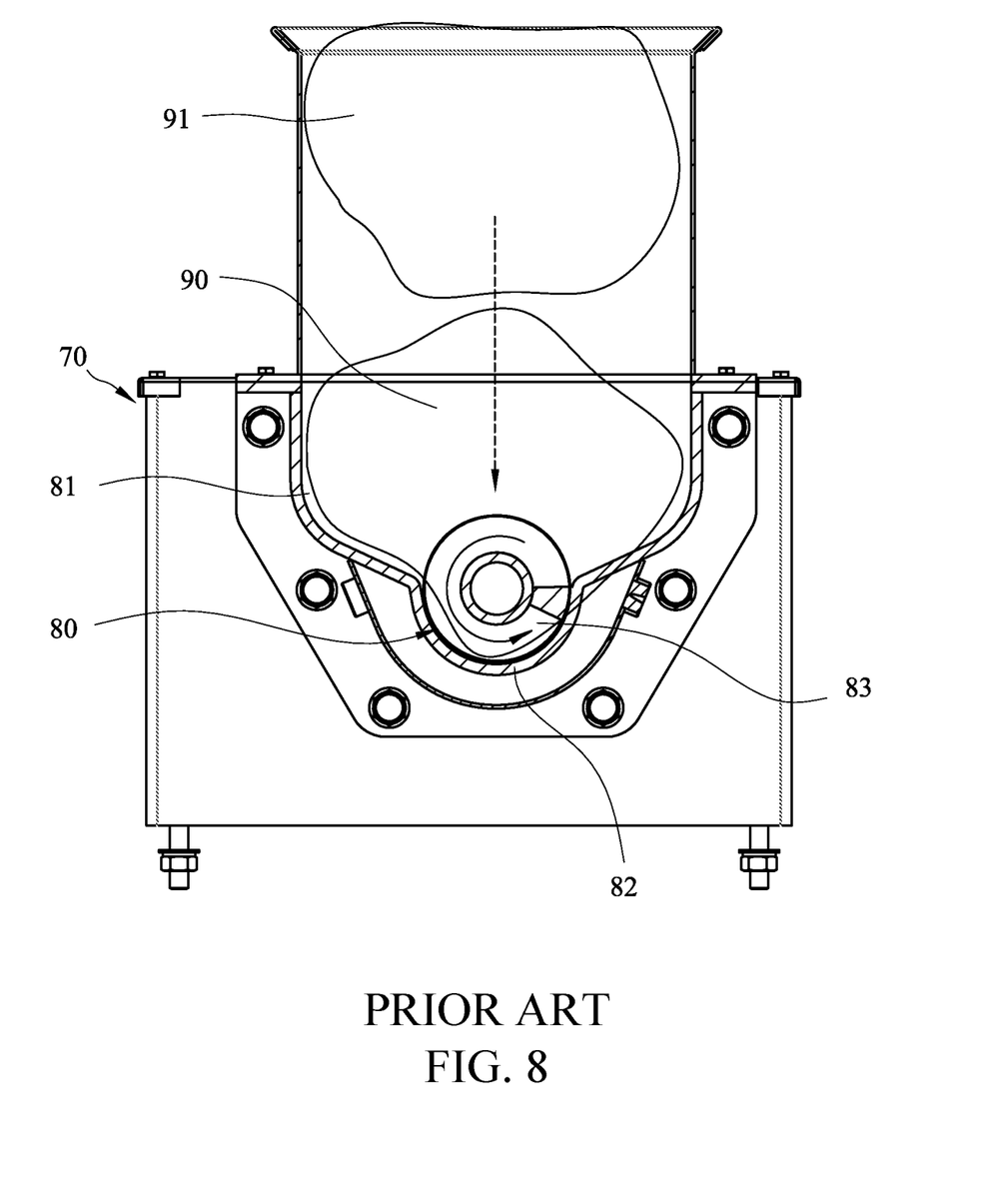
FIG. 8 is another schematic view demonstrating a drawback caused by the known kneading and feeding system during the operation thereof.

The known structure, however, suffers the following disadvantages:

(1) As shown in FIGS. 7 and 8, when the screw shaft 83 is put into rotation, the blade 84 provided on an outer circumference of the screw shaft kneads and feeds the dough 90 toward a discharge opening 810 of the dough barrel 80 to subsequently enter the ejection nozzle 82. However, at the site of entering from the dough handling space 81 of the dough barrel 80 into the ejection nozzle 82, the inside diameter is abruptly reduced so that the dough 90 often accumulates at the discharge opening 810 of the dough barrel 80, making the dough 90 distributed in an inhomogeneous condition inside the dough barrel 80 and massively accumulating at the discharge opening 810, so that dough cannot be kneaded uniformly (and thus the quality of dough is affected), and the feeding speed of the dough has to slow down or even interrupt. This is one of the common drawbacks of the prior art devices.

(2) Referring to FIGS. 8 and 9, feeding multiple dough blocks successively without interruption is a common practice in a dough preparing process. A dough piece 91 is supplied immediately after the processing of a previous dough piece 90 is completed in order to ensure no interruption of dough processing. However, due to being accumulated at the discharge opening 810 of the dough barrel 80, the dough 90 has an elevated height d1 at discharge opening 810 and a height of the part of the dough 90 that is located rearwardly is smaller, so that a steep slope is formed. The next dough piece 91, when placed into the dough barrel 80, may generate a gap S with respect to the already-processed dough piece 90 and thus, interruption of dough feeding occurs between the two dough pieces 90, 91, causing defects in the subsequent dough processing, such as stuffing and noodle making, or even total waste of the dough. This is another drawback of the prior art devices.

(3) Some known devices include one or two additional rotary screws (not shown) arranged in the dough barrel 80 to help move dough forward. However, these screws are provided to move the dough toward the discharge opening only and may cause a wore condition of accumulation and thus jamming of dough that in turn makes the accumulation height d2 of the dough inside the dough barrel even more severe. Application of external forces may be needed to remove the jamming and this increases cost of human labor and potential risk of hurting of the operator. Apparently, the known devices provide no effect solution at all. This is one of the bottlenecks of the prior art in operations of kneading and feeding of dough and is also a shortcoming needs an immediate solution.

SUMMARY OF THE INVENTION

The primary objective of the present invention is to provide a solution for handling the drawbacks of the prior art that performance of dough kneading is poor and dough may not be fed in a continuous manner without interruption due to dough being accumulated at a front part of a dough barrel in a dough kneading and feeding system of a conventional dough processing machine, and the solution proposed in the present invention comprises a dough barrel, which comprises a dough handling space. At least one shaft hole and one discharge opening are provided in the dough handling space. A bearing is provided in the shaft hole. A feeding hopper is provided above the dough barrel. A screw shaft extends through the shaft hole and the discharge opening of the dough handling space of the dough barrel. An ejection nozzle is coupled with the discharge opening. The screw shaft is provided with a blade, which drives a dough material toward the discharge opening that is arranged at a front side to be ejected and discharged through the ejection nozzle. At least one assisting screw is arranged in combination with a bearing in a parallel manner in the dough handling space. The assisting screw is associated with a shaft hole, and is driven by a rotary transmission axle. The assisting screw is provided with at least one helical blade. The at least one helical blade is rotatable in a rotation direction that drives the dough material in a direction that is opposite to the direction of the dough material driven by the screw shaft and also drives the dough material toward the screw shaft in a radial direction of the screw shaft. As such, a portion of dough that accumulates in the dough handling space can be re-filled back into the screw shaft to help reduce the potential risk of interruption of dough feeding.

Another objective of the present invention is, following the description provided above, to provide the at least one assisting screw as a first assisting screw and a second assisting screw that are opposite to each other and parallel to each other in the dough handling space. The two assisting screws are rotatable in opposite rotation directions with one of the two assisting screws being a left-handed screw and another one being a right-handed screw, the two rotatable in opposite directions so as to make kneading of dough better and reduce potential issue of interruption of feeding.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1, 2, 3, and 5, the present invention at least comprises:

a dough barrel 10, which comprises and defined a dough handling space 11, a shaft hole 12 and the discharge opening 13 being provided in the dough handling space 11, a bearing 52 being provided at the shaft hole 12, a feeding hopper 60 being provided above the dough barrel 10; and a screw shaft 20, which extends through the shaft hole 12 and the discharge opening 13 of the dough handling space 11 of the dough barrel 10, and is coupled to an ejection nozzle 30 at the discharge opening 13, the screw shaft 20 being provided with a blade 21 which is a left-handed or a right-handed blade-, which drives a dough material toward the discharge opening 13 that is located at a front side to be ejected and discharged through the ejection nozzle 30.

Referring to FIGS. 1, 2, 4, and 5, a first assisting screw 40 and a second assisting screw 40' are provided, in combination with bearings 52, in parallel with each other in the dough handling space 11. The first assisting screw 40 and the second assisting screw 40' are each associated with a shaft hole 41 and is driven by a rotary transmission axle 43. The first assisting screw 40 and the second assisting screw 40' each has a surface that is provided, in a circumferentially arranged manner, with, but not limited to, three helical blades 42a, 42b, 42c. The helical blades 42a, 42b, 42c are arranged to rotate in a direction that drives the dough material in a direction toward a rear wall 101 of the dough handling space 11, namely in a direction that is opposite to the direction of dough driving of the screw shaft, and simultaneously feeds the dough material toward the screw shaft. Taking the illustration of FIG. 1 as an example for description, the first assisting screw 40 that is located at the right-hand side of the drawing sheet is arranged as a left-handed screw, and the second assisting screw 40' that is located at the left-hand side of the drawing sheet is arranged as a right-handed screw. This arrangement is completely different from the prior art and a major feature of this is that dough material is caused or driven to move toward the rear wall 101 of the dough handling space.

Although the first assisting screw 40 and the second assisting screw 40' are structured to include three helical blades 42a, 42b, 42c as a preferred embodiment, in actual operations, the dough material may be fed with different speeds and, as an alternative, the number of the helical blades 42a, 42b, 42c may be reduced to one or two (not shown), or increased, to achieve the same or desired effect.

Figure 1:
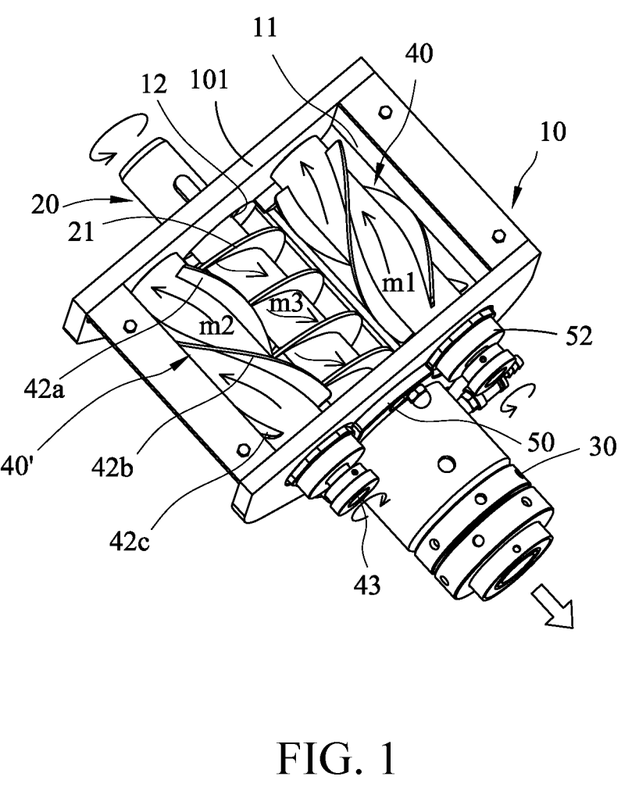
FIG. 1 is a perspective view showing the present invention.
Figure 2:
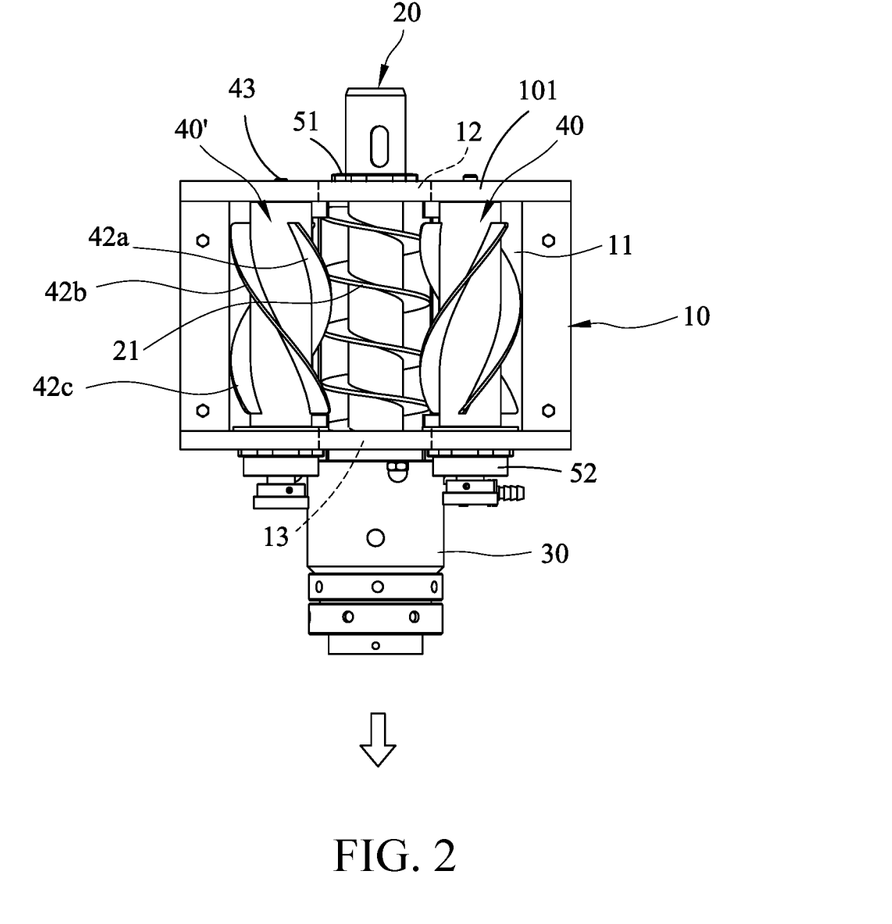
FIG. 2 is a top plan view showing the present invention in an assembled condition.
Figure 3:
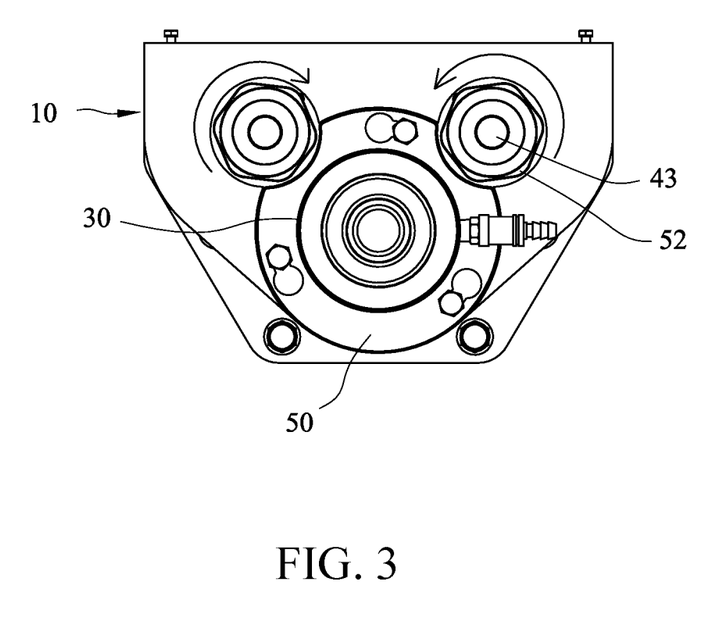
FIG. 3 is a front view of the present invention.
Figure 4:
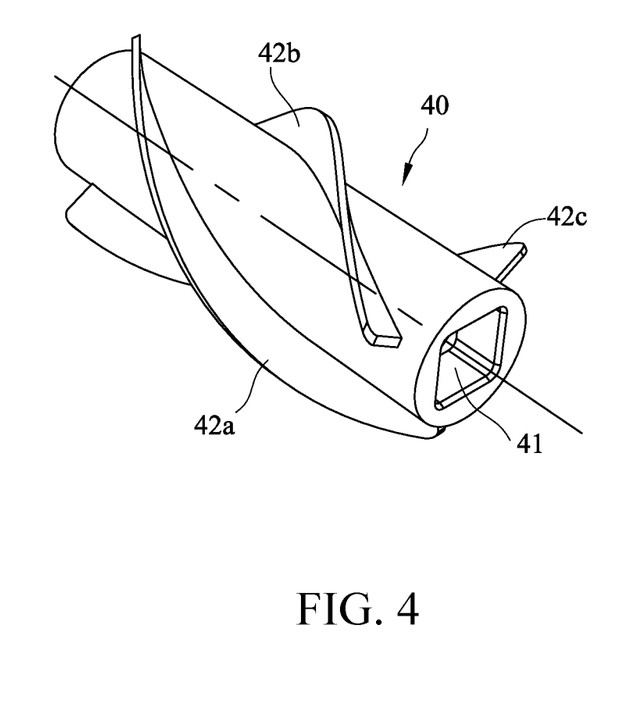
FIG. 4 is a perspective view showing a first assisting screw.
Figure 5:
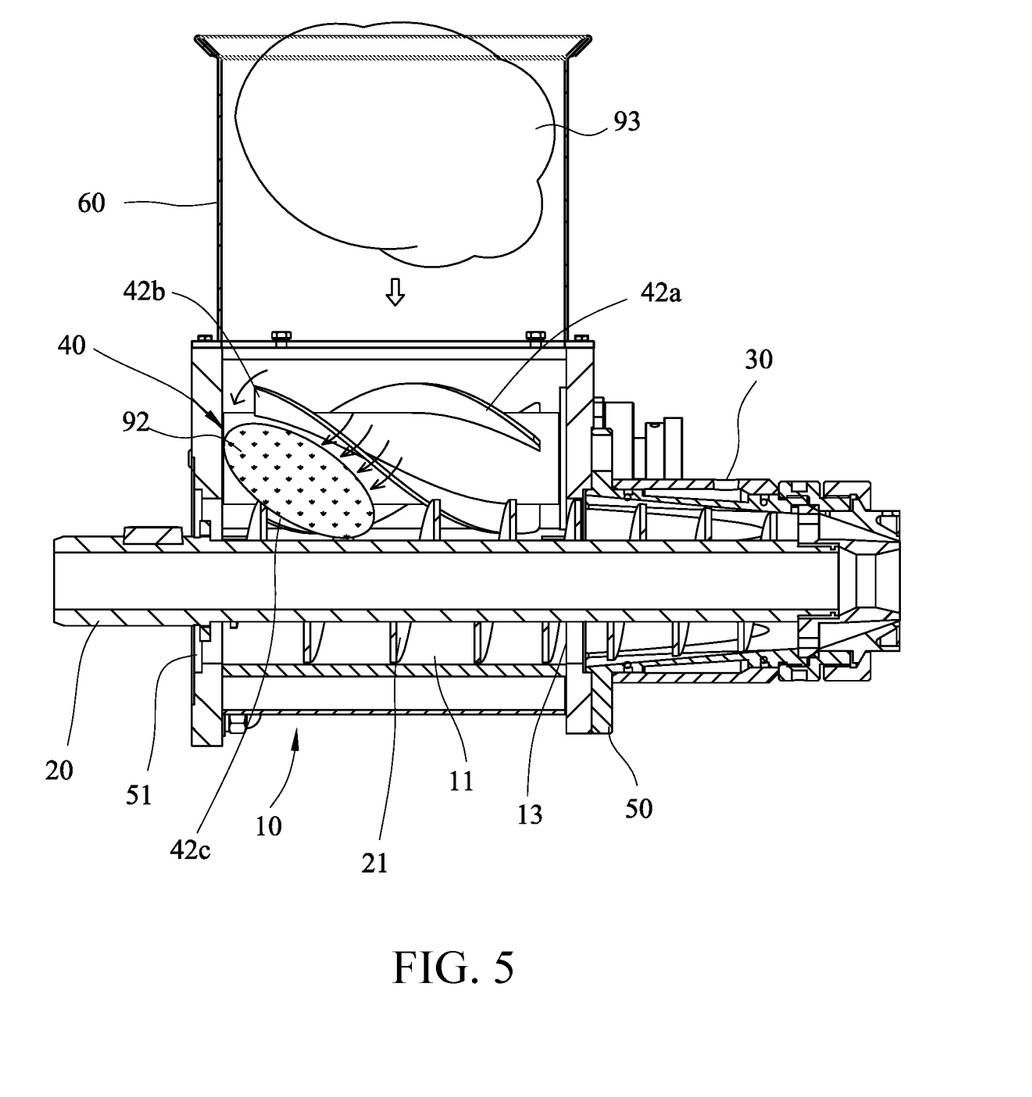
FIG. 5 is a schematic view demonstrating an operation of the first assisting screw in a barrel according to the present invention.

Referring to FIGS. 1, 2, 3, and 5, to use the present invention, dough 93 is deposited through the feeding hopper 60 into the dough handling space 11 of the dough barrel 10. Firstly, the first assisting screw 40 and the second assisting screw 40' are driven to rotate in opposite directions to push and depress the dough 93 downward. Due to the directions of rotation of the helical blades 42a, 42b, 42c, the dough material is driven toward the rear wall 101 of the dough handling space 11 (as shown in FIGS. 1 and 5), so that portions of the dough 93 on two opposite sides of the screw shaft 20 inside the dough barrel 10 are moved in moving directions m1, m2 toward the rear wall 101 of the dough handling space 11 to make dough 92, while the screw shaft 20 drives the dough 92 in a moving direction m3 toward the ejection nozzle 30 of the dough handling space 11. This arrangement provides the present invention with the following advantages:

(1) In the dough handling space 11 of the dough barrel 10, the first assisting screw 40 and the second assisting screw 40' push and knead the dough 93 toward the rear wall 101 of the dough handling space 11 to make the dough 92, and the screw shaft 20 pushes and kneads the dough 92 in a direction toward the ejection nozzle 30 of the dough handling space 11, while at the same time, the first assisting screw 40 and the second assisting screw 40' further pushes and kneads the dough 92 in a downward direction to provide more better performance of kneading of the dough 92. This is an advantage of this invention.

(2) when the screw shaft 20 drives the dough 92 in a direction toward the ejection nozzle 30, the dough 92 is accumulated at a location just in anterior to the discharge opening 13 of the dough handling space 11. The present invention provides a novel feature of the first assisting screw 40 and the second assisting screw 40' that function to knead and push the dough 92 in an opposite direction so that the dough 92 can be made in a more leveled condition inside the dough barrel 10. This is another advantage of the present invention.

(3) Following the description provided above, when multiple pieces of the dough 92 are successively fed into the dough barrel 10, due to the unique feature of the first assisting screw 40 and the second assisting screw 40' provided in the present invention, the dough 92 can be driven in a direction toward the screw shaft and also toward the rear side, as a measure of filling up, so that previous dough 92 and next dough 93 can be efficiently mixed together to reduce the chance of occurrence of a gap therebetween. This is a further advantage of the present invention.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

We claim:

1. A dough kneading and feeding system for use in a dough processing machine, comprising at least:

a dough barrel, which comprises and defines a dough handling space, at least a shaft hole and a discharging opening penetrating through the dough barrel, wherein the discharging opening of the dough barrel is coupled with an ejection nozzle;

a screw shaft, which extends through the dough handling space of the dough barrel, the screw shaft being provided with a left-handed blade, which drives a dough material inside the dough barrel in a direction toward the discharging opening located at a front side, the screw shaft being extended into the ejection nozzle;

a first assisting screw and a second assisting screw arranged in the dough handling space to be parallel to the screw shaft, the first assisting screw and the second assisting screw each being provided with three helical blades, the three helical blades of each assisting screw being rotatable in a rotation direction that drive the dough material in a direction opposite to the direction of the dough material driven by the screw shaft and also drive the dough material toward the screw shaft; and wherein the first assisting screw comprises three left-handed helical blades and the second assisting screw comprises three right-handed helical blades.

\* \* \* \* \*